3,004,076
PREPARATION OF HALOGEN-CONTAINING
STILBENES AND BIBENZYLS
William M. Le Suer and Carl W. Stuebe, Cleveland, Ohio, assignors to The Lubrizol Corporation, Willoughby, Ohio, a corporation of Ohio
No Drawing. Filed July 1, 1960, Ser. No. 40,136
7 Claims. (Cl. 260—649)

This invention relates to the preparation of halogen-containing aromatic compounds. In a more particular consideration, it relates to the preparation of such aromatic compounds which contain at least two aromatic nuclei.

The alpha, alpha'-diaryl ethylene nucleus has received serious consideration because of its recently discovered value in many applications. It is found, for example within the chemical structure of brightening agents, sex hormones, etc. In view of such applications the synthesis and further exploitation of such chemical structures is desirable.

The particular products of the process of this invention are alpha, alpha'-diaryl ethylenes in which there is attached also at least one halogen atom to each of the carbon atoms of the ethylene residue. For economic reasons, the process of this invention is particularly applicable to the preparation of alpha, alpha'-diaryl ethylenes in which there is attached at least one chlorine atom to each of the carbon atoms of the ethylene residue. Illustrative of such compounds are the alpha, alpha'-dichlorostilbenes which comprise a preferred type of product of this invention. Other such products include the syn-diphenyltetrachloroethane.

It is accordingly a principal object of this invention to provide a novel method of preparation of the above-indicated halogen-containing aromatic compounds.

It is also an object of the present invention to provide a process for the preparation of halogen-substituted stilbenes.

It is also an object of the present invention to provide a process for the preparation of chlorine-containing stilbenes.

Other objects will be apparent from the following description.

These objects have been accomplished by the process of preparing halogen-containing compounds which comprises heating a mixture of:

(a) A trihalomethyl substituted aromatic compound having the structure $$Ar(CX_3)y$$

where Ar is a non-functional aromatic radical attached to the carbon atom through a benzenoid carbon atom, X is a halogen atom, and y is an integer between 1 and 3;
(b) Elemental phosphorus; and
(c) From about 0.001 to about 5.0% of the combined weight of (a) and (b) of hydrogen iodide.

The trihalomethyl substituted aromatic compounds comprise principally benzotrihalides and substituted benzotrihalides such as benzotribromide, substituted benzotribromides, benzotrichloride and substituted benzotrichlorides. Such compounds may readily be prepared by the halogenation of toluene and the corresponding substituted toluenes. Other preparative methods such as alkylation of benzotrihalides may also be used. Illustrative examples of such trihalomethyl substituted aromatic compounds are benzotribromide, trichloro mesitylene, benzotrichloride, p-chlorobenzotrichloride, o-bromobenzotrichloride, alkylbenzotrichlorides, polyalkyl benzotrichlorides, 3-trichloromethyl pyridine, 4-trichloromethyl quinoline, p-phenylbenzotrichloride, trichloromethyl substituted polynucleus aromatic compounds such as trichloromethyl naphthalene, etc. The trichloromethyl substituted atomatic compounds are preferred for use in the reaction described herein because of their availability at the present time.

It will be noted that in each of the above examples the aromatic residue is non-functional; i.e., it does not contain any functional groups which might take part in or interfere with the reaction of the hereindescribed process.

Although the physical characteristics of the elemental phosphorus which may be used in the process are not critical, it is preferred to use red phosphorus.

The relative amounts of reactants determine the character of the product which is available therefrom. The function of the phosphorus appears to be associated with its ability to abstract halogen from two molecules of trihalomethyl compound, the resulting by-product consisting largely of phosphorus trihalide which is readily removed from the reaction mixture by distillation. Accordingly, a high phosphorus to trihalomethyl compound ratio will result in a product having less halogen than in the case of a reaction mixture which contains a low phosphorus to trihalomethyl compound ratio.

Generally, when it is desired to prepare dihalostilbenes, a ratio of one mole of phosphorus to one mole of trihalomethyl compound is used. On the other hand, the use of one mole of phosphorus per three moles of trihalomethyl compound results in the formation of a relatively large proportion of tetrahaloethanes.

As indicated, the reaction is catalyzed by hydrogen iodide. The catalyst is most conveniently introduced into the reaction mass as an aqueous solution. Gaseous hydrogen iodide may likewise be used, in which case it may be brought into contact with the reactants by bubbling it through the reaction mixture and agitating the resulting mass to obtain adequate mixing. In general, aqueous hydrogen iodide solutions containing from about 40% to about 60% of hydrogen iodide are preferred for use in reactions of this invention.

The catalyst is effective in very small amounts, as small as 0.001% of the combined weight of the trihalomethyl substituted aromatic hydrocarbon compound and the elemental phosphorus reactant. The effectiveness of increased amounts of the catalyst seems to level off above about 5%. In most instances the most effective amounts of the catalyst appear to be within the range of about 0.1% to about 3% of the combined weight of the two reactants.

The reaction of the process requires somewhat elevated temperatures. The usual reaction will be run, for example, at a temperature within the range of 150° to 300° C., although within the limits imposed by the stability of the reactants the reaction may be carried out at even higher temperatures. Likewise, in some particular instances the process may be carried out at temperatures below 150° C., for example, at 125° C. In most cases, the reaction will require at least one hour. The progress of the reaction may be noted by the amount of phosphorus trihalide which distills from the reaction mixture, and when this distillation has ceased, it may be assumed that the reaction is complete. Usually all of the available phosphorus trihalide has been distilled within four or five hours. The reaction generally is carried out at atmospheric pressure although it may in some particular instance be carried out at super-atmospheric or reduced pressure.

When all of the phosphorus trihalide has distilled from the reaction mixture, there usually remains some unreacted phosphorus. This can be removed by adding an organic solvent such as benzene to the mixture and filtering the benzene solution from the phosphorus. Removal of the organic solvent from the filtrate by evaporation and subsequent distillation of the residue yields the desired product. The product may be purified further by crystallization from an organic solvent.

A particularly valuable application of the process resides in the use as starting materials of bis-(trihalomethyl) aromatic compounds. Such starting materials are illustrated by bis-(p-trihalomethyl) benzene which is the completely aliphatically halogenated product of p-xylene. It will be noted that in the process of this invention such a starting material is bifunctional. The reaction of a bis-trihalomethyl compound with phosphorus in the presence of small amounts of a catalyst is in effect a polymerization reaction.

Again depending upon the relative amounts of reactants employed, the polymeric product may contain either di-halostilbene units or tetrahalobibenzyl units. In either case the polymeric product is useful with regard to applications in the field of electrical insulation, etc.

The preparation of such polymers may be effected by the same process by which the hereinbefore described products are prepared.

The process of the invention is illustrated in more detail by the following examples:

EXAMPLE 1

A mixture of 69 grams (0.35 mole) of benzotrichloride, 7.6 grams (0.25 mole) of red phosphorus, 0.5 gram of hydrogen iodide (as 50% aqeous hydrogen iodide solution), and 150 grams of o-dichlorobenzene (solvent) was heated at reflux (185° C.) for five hours. During this time, phosphorus trichloride was collected as a distillate. The residue was filtered while still hot, and the filtrate was allowed to cool in an ice-box overnight. A total of 39 grams of crystalline product was precipitated from the filtrate and was found to have a chlorine content of 44.2%, the theoretical chlorine content of alpha, alpha, alpha', alpha'-tetrachlorobibenzyl being 44.4%.

EXAMPLE 2

A mixture of 20 grams (0.055 mole) of benzotribromide, 1 gram (0.031 mole) of red phosphorus, 0.5 gram of hydrogen iodide (as 50% aqueous hydrogen iodide solution), and 150 grams of o-dichlorobenzene was heated at the reflux temperature (185° C.) for four hours. The reaction mass was filtered while hot. Upon cooling of the filtrate, a crystalline solid product was obtained which was found to have a bromine content of 47.8%, the theoretical bromine content of alpha, alpha'-dibromostilbene being 47.5%.

EXAMPLE 3

A mixture of 75 grams (0.38 mole) of benzotrichloride, 8.2 grams (0.27 mole) of red phosphorus, 0.5 gram of hydrogen iodide (as 50% aqueous solution), and 175 grams of diphenyl oxide (solvent) was heated at 235° C. for five hours. The mass was then filtered and diphenyl oxide removed by distillation from the filtrate. The residue was distilled to give 20 grams of a white crystalline product having a chlorine content of 44.5%.

EXAMPLE 4

A mixture of 62.5 grams (0.2 mole) of p-bis(trichloromethyl) benzene, 3.2 grams (0.1 mole) of red phosphorus, 0.5 gram of hydrogen iodide (as 50% aqueous solution), and 150 grams of o-dichlorobenzene was heated at 185° C. for five hours and then filtered. The filtrate yielded upon cooling an amorphous polymeric product having a chlorine content of 61.28% and an average molecular weight of 720.

The compositions of this invention are useful as plasticizers, as synergists for DDT, and as insecticides (e.g., water emulsion insecticidal composition comprising water containing 0.1–0.5% of the product of Example 3 and 0.5–2% of sodium dodecylbenzene sulfonate as the emulsifier).

Other modes of applying the principle of the invention may be employed, change being made as regards the details described, provided the features stated in any of the following claims or the equivalent of such be employed.

We therefore particularly point out and distinctly claim as our invention:

1. The process of preparing halogen-containing compounds which comprises heating at a temperature within the range of 125–300° C. a mixture of:

(a) a trihalomethyl-substituted aromatic compound having the structure

where Ar is a non-functional aromatic radical attached to the carbon atom through a benzenoid carbon atom, X is a halogen atom selected from the class consisting of chlorine and bromine atoms and $y$ is an integer between 1 and 3;

(b) elemental phosphorus; and (c) from about 0.001 to about 5.0% of the combined weight of (a) and (b) of hydrogen iodide.

2. The process of claim 1 characterized further in that the trihalomethyl-substituted aromatic compound of (a) is a trichloromethyl substituted benzene.

3. The process of claim 1 characterized further in that the trihalomethyl-substituted aromatic compound of (a) is benzotrichloride.

4. The process of claim 1 characterized further in that the compound of (c) is an aqueous hydrogen iodide solution.

5. The process of claim 1 characterized further in that the compound of (c) is an aqueous hydrogen iodide solution containing from about 40% to about 60% by weight of hydrogen iodide.

6. The process of preparing halogen-containing compounds which comprises heating at a temperature within the range of 125–300° C. a mixture of:

(a) a trichloromethyl-substituted benzene, (b) elemental phosphorus, and (c) from about 0.001 to about 2.0% of the combined weight of (a) and (b) of an aqueous hydrogen iodide solution.

7. The process of claim 1 characterized further in that the molar ratio of (a) to (b) is between about 1:1 and 3:1.

No references cited.